Nov. 23, 1926. 1,608,147
H. VIERLING
METHOD AND APPARATUS FOR WITHDRAWING WATER FROM SUBSTANCES
AND IMMEDIATELY THEREAFTER BINDING THE WATER
Filed April 27, 1923
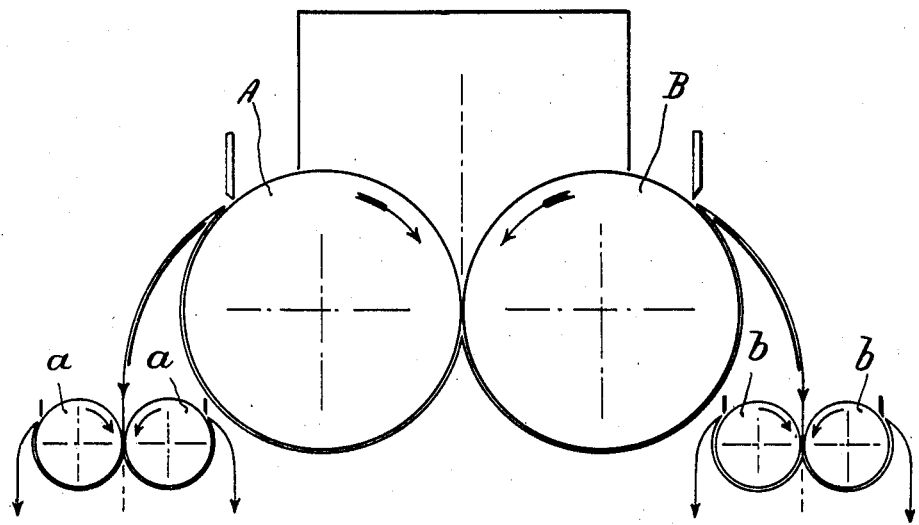

Patented Nov. 23, 1926.

1,608,147

UNITED STATES PATENT OFFICE.

HUBERT VIERLING, OF MUNICH, GERMANY, ASSIGNOR TO TROCKNUNGS-ANLAGEN-GESELLSCHAFT MIT BESCHRÄNKTER HAFTUNG, OF BERLIN, GERMANY.

METHOD AND APPARATUS FOR WITHDRAWING WATER FROM SUBSTANCES AND IMMEDIATELY THEREAFTER BINDING THE WATER.

Application filed April 27, 1923, Serial No. 635,171, and in Germany May 9, 1922.

In the previously proposed methods of evaporating water from liquid or semi-liquid substances such as glue and soap by means of steam heated rollers, great difficulty is experienced in withdrawing the water to the exact degree required for manufacturing purposes and for further treatment, in consequence of subsequent evaporation of the water taking place owing to the residual heat in the material. In many cases a dry product is obtained having such a low degree of humidity that it is crystalline or otherwise unfit for further treatment even by adding water again.

It has previously been proposed to dry semi-liquid substances by passing them in a thin layer over steam-heated drying cylinders, the dried material being scraped off by a scraping blade and cooled and disintegrated by exposing it to a current of air, the material in one case being also allowed to fall between wings of wire cloth or perforate metal fixed to a rotating cylinder. By cooling the material in this manner, if it is not already quite dry when it leaves the steam heated cylinder, further evaporation takes place during cooling.

The object of the invention is to overcome the difficulties above referred to and with this object in view the invention consists in removing part of the water by means of cylinder driers and immediately thereafter cooling the substance by means of cooling cylinders, so as to prevent subsequent evaporation due to residual heat in the material and thereby enable a product to be obtained having a predetermined degree of humidity. The material is treated on rotating cylinders, some of which are heated and some cooled, the output and the motion of the cylinders being interdependent.

In carrying out the method, the base soap, for instance, is passed over heated cylinders, a certain amount of water being evaporated according to the temperature and speed of rotation of the cylinders. The soap then passes directly to cooled rollers or cylinders, which, by cooling the material, prevent any further evaporation due to the residual heat in the material.

The accompanying drawing shows diagrammatically how the invention is carried into effect.

To each of the heated cylinders A and B pairs of cooled rollers or cylinders $a, a$ and $b, b$ are coordinated. By means of the cylinders A and B the withdrawal of water may be carried to the required degree of humidity, the product being immediately cooled and the required amount of residual moisture immediately fixed and retained by the rollers or cylinders $a, a$ and $b, b$.

What I claim is:—

1. A method of evaporating water from liquid or semi-liquid substances consisting in depositing the substance to be treated upon a moving heated surface, removing the substance from said surface after a predetermined amount of water has been evaporated from the substance, and immediately thereafter depositing said substance on a moving cooled surface, so as to prevent subsequent evaporation due to residual heat in the material and thereby enable a product to be obtained having a predetermined degree of humidity.

2. An apparatus for evaporating water from liquid or semi-liquid substances comprising heated rotatable drums upon which the substance to be treated is deposited, means arranged at predetermined points relatively to the peripheries of the drums for scraping the substance from the drums after a predetermined amount of evaporation has taken place, and cooled drums arranged to immediately receive the substance from the heated drums for cooling the substance so as to prevent subsequent evaporation due to residual heat in the material and thereby enable a product to be obtained having a predetermined degree of humidity.

In testimony whereof I have signed my name to this specification.

Dr. HUBERT VIERLING.